United States Patent [19]

Fujiwara

[11] Patent Number: 4,721,186
[45] Date of Patent: Jan. 26, 1988

[54] LUBRICATOR

[75] Inventor: Masaki Fujiwara, Saitama, Japan

[73] Assignee: SMC Kabushiki Kaisha, Tokyo, Japan

[21] Appl. No.: 850,563

[22] Filed: Apr. 11, 1986

[30] Foreign Application Priority Data

Apr. 15, 1985 [JP] Japan .................... 60-55764[U]

[51] Int. Cl.⁴ .................................................. F01M 1/08
[52] U.S. Cl. ............................... 184/55.1; 184/55.2; 137/205.5; 261/78.2; 138/45; 239/366
[58] Field of Search ............. 184/55.1, 55.2, 57; 137/599.1, 855, 205.5; 261/78 A, DIG. 65; 138/37, 39, 44–46; 366/336, 337; 239/533.13, 366

[56] References Cited

U.S. PATENT DOCUMENTS

| 7,663 | 5/1877 | Gates | 184/55.1 |
|---|---|---|---|
| Re. 24,291 | 3/1957 | Goodyer | 184/55.2 |
| 2,003,132 | 5/1935 | Bliss | 184/55.1 |
| 2,565,691 | 8/1951 | Ketelsen | 184/55.2 |
| 2,656,899 | 10/1953 | Ketelsen | 184/55.2 |
| 2,747,688 | 5/1956 | Faust | 184/55.2 |
| 2,857,983 | 10/1958 | Shada | 184/55.2 |
| 2,913,234 | 11/1959 | Beaurline | 184/55.2 |
| 2,917,271 | 12/1959 | Banks | 138/46 |
| 3,214,054 | 10/1965 | Poethig | 184/55.2 |
| 3,511,341 | 5/1970 | German | 184/55.1 |
| 3,785,461 | 1/1974 | Rompa | 184/55.2 |

Primary Examiner—Carlton R. Croyle
Assistant Examiner—Jane E. Obee
Attorney, Agent, or Firm—Burns, Doane, Swecker & Mathis

[57] ABSTRACT

A lubricator includes a body having a passage for a fluid under pressure, at least one hole communicating perpendicularly to the passage, and a restriction member fitted in the hole and positionable in the passage, a case securely mounted on the body and having a chamber communicating with the passage and capable of storing oil, and a dropping window communicating with the chamber through an oil conduit tube and a dropping tube and also communicating through a passageway with the passage downstream of the restriction members in the direction of flow of the fluid through the passage.

3 Claims, 5 Drawing Figures

LUBRICATOR

BACKGROUND OF THE INVENTION

The present invention relates to a lubricator, and more particularly to a lubricator including a body defining therein a passage for a fluid under pressure and a restriction member displaceably disposed directly in the passage for suitably regulating the amount of oil to be atomized in the flow of the fluid under pressure, thus eliminating an oil needle valve to achieve a large reduction in the size of the lubricator.

When driving a cylinder device serving as a pneumatic device, a certain amount of lubricating oil is mixed with a working fluid to reduce friction and wear caused on the sliding surfaces of a piston and an inner cylinder wall.

Generally, lubricators are widely used to mix the lubricating oil with the working fluid. When air under pressure is supplied to the passage in the body of the lubricator, a differential pressure is produced upon passage of the air under pressure through a venturi defined in the passage. The lubricating oil stored in a lubricator case is caused by the differential pressure to be atomized and mixed with the air flow under pressure, and is supplied together with the air into the cylinder.

One general conventional lubricator is illustrated in FIG. 1 of the accompanying drawings.

The lubricator comprises a body 2 having a fluid inlet port 4 and a fluid outlet port 6 which are held in communication with each other through a passage 8. The passage 8 has a venturi (not shown) disposed substantially centrally in the body 2 and having an opening of a reduced cross-sectional area. A projection 10 of a bent cross section is disposed on the upper end of the body 2 and includes a needle valve 12 and a dropping window 14. An oil supply port 16 is also disposed on the top of the body 2. An oil conduit tube 18 and an oil reservoir case 20 are fixed to the lower end of the body 2, with the oil conduit tube 18 having an end immersed in oil stored in the oil reservoir case 20.

When air under pressure is supplied from an air supply to the fluid inlet port 4, the air flows through the passage 8 and is supplied from the fluid outlet port 6 to a desired location. As a portion of the air in the passage 8 is introduced via a non-illustrated passageway into the case 20, the air pressure in the case 20 is increased. When the air in the passage 8 passes the venturi (not shown), a pressure drop is developed as the air flows through the different cross-sectional area of the passage 8. Therefore, the pressure in the dropping window 14 which communicates with the passage 8 through the passageway is equalized to the reduced pressure in the passage 8. The oil in the case 20 is now forced through the oil conduit tube 18 and another non-illustrated passageway into the needle valve 12 under the pressure difference between the air pressure acting on the oil in the case 20 and the air pressure in the dropping window 14. The oil then drops from the needle valve 12 into the dropping window 14 so as to be atomized via the passageway into the passage 8 in which the atomized oil is mixed with the air flowing under pressure therethrough. The oil mixed with the air under pressure is then delivered to a port of a cylinder (not shown). The amount of oil dropping into the dropping window 14 can be varied by adjusting the needle valve 12.

As can easily be understood from FIG. 1, the conventional lubricator is quite large in size since the oil supply port is disposed on the body and the upwardly projecting needle valve is mounted on the body. In recent years, control devices operable under fluid pressure are widely used at production sites to meet demands for automatization and higher efficiency of operation. In addition, it is also desired to reduce the size of these control devices as much as possible for the purpose of increasing an available space in factories. The conventional lubricator however fails to fully meet the above demands.

SUMMARY OF THE INVENTION

It is a general object of the present invention to provide a lubricator having restriction members positionable directly in a passage defined in a body for air under pressure, so that an oil needle valve which would otherwise be employed in lubricators is eliminated, the amount of oil atomized in air under pressure can suitably be regulated, and the size of the lubricator is reduced.

Another object of the present invention is to provide a lubricator comprising: a body having a passage for a fluid under pressure, a pair of holes communicating perpendicularly to the passage, and a restriction member fitted in one of the holes and positionable in the passage; a case securely mounted on the body and having a chamber communicating with the passage and capable of storing oil; and a dropping window communicating with the chamber through an oil conduit tube and a dropping tube and also communication through a passageway with the passage downstream of the restriction members in the direction of flow of the fluid through the passage.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
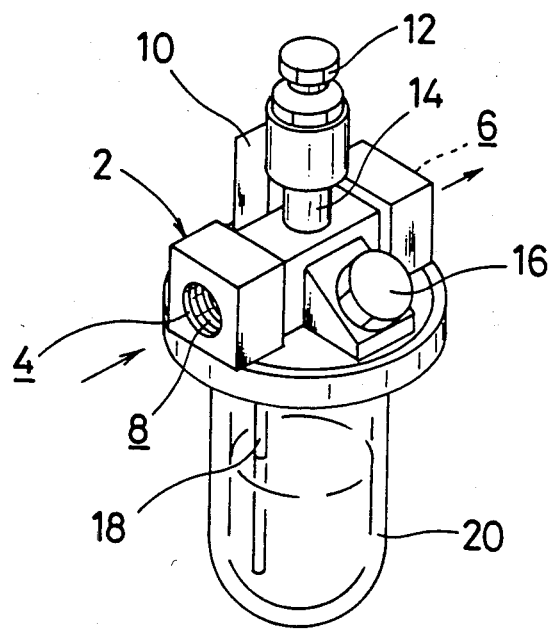
FIG. 1 is a perspective view of a conventional lubricator.
Figure 2:
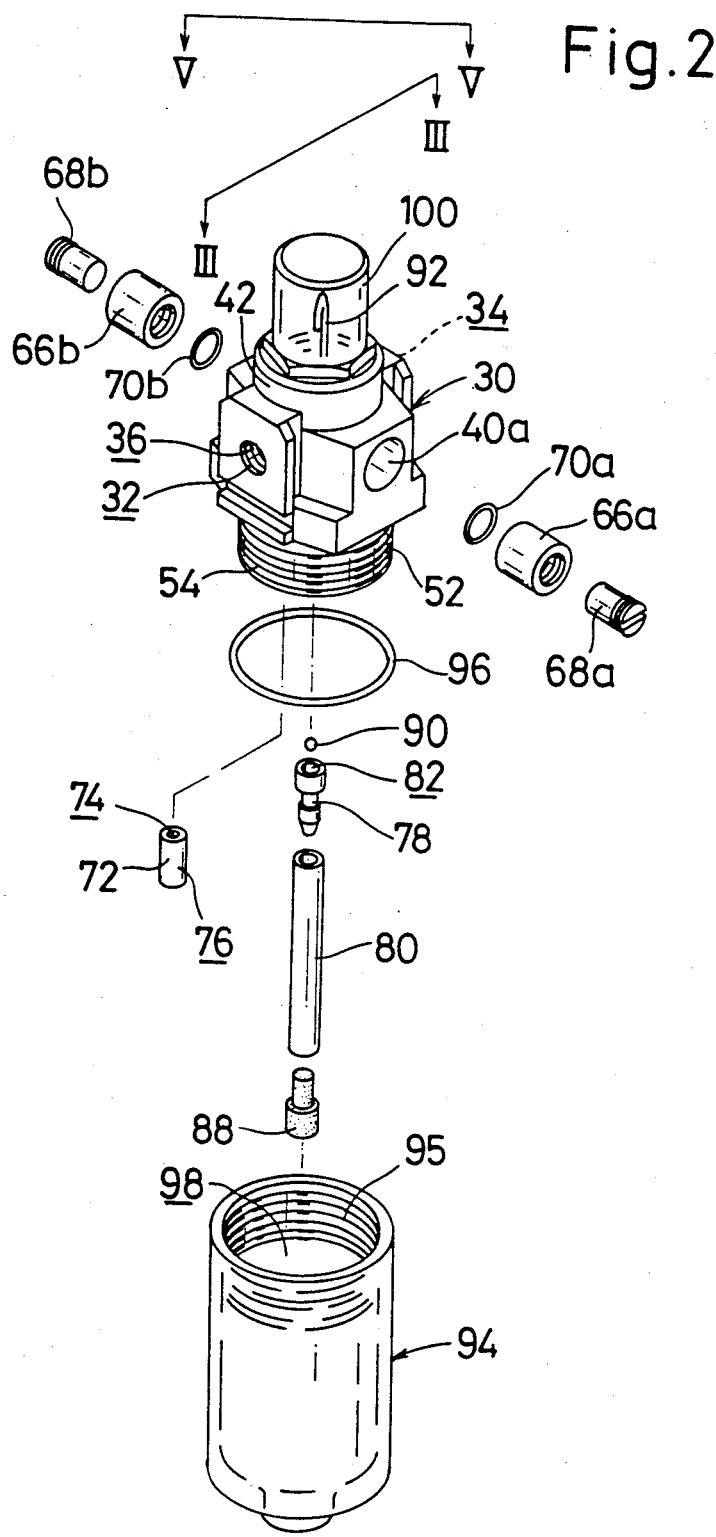
FIG. 2 is an exploded perspective view of a lubricator according to the present invention.
Figure 3:
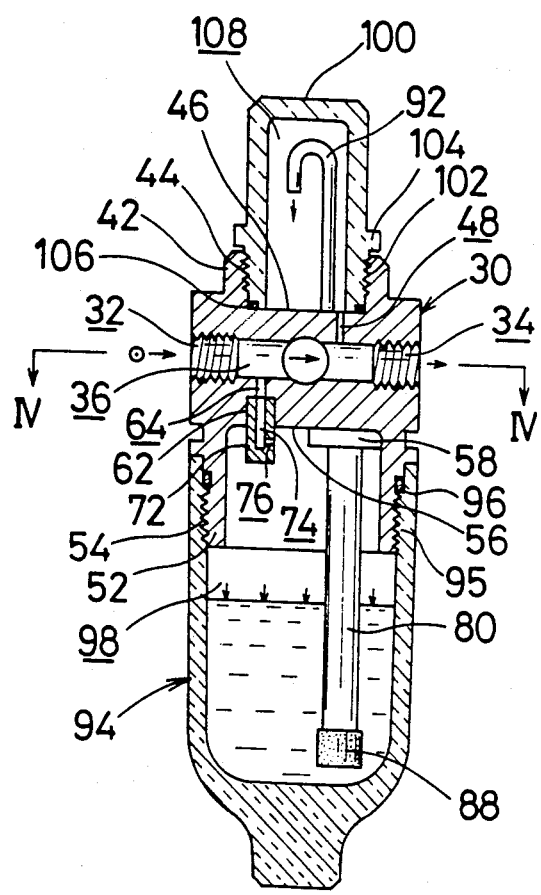
FIG. 3 is a cross-sectional view taken along line III—III of FIG. 2, showing the lubricator as assembled.
Figure 4:
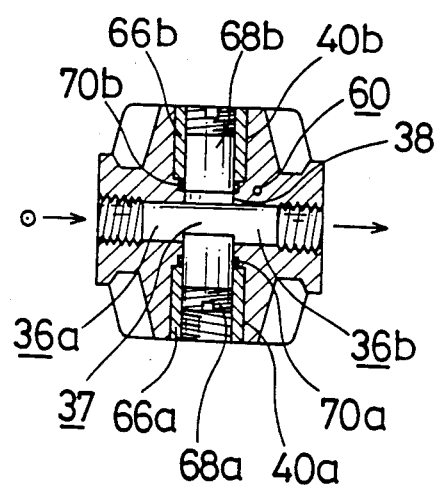
FIG. 4 is a cross-sectional view taken along line IV—IV of FIG. 3.
Figure 5:
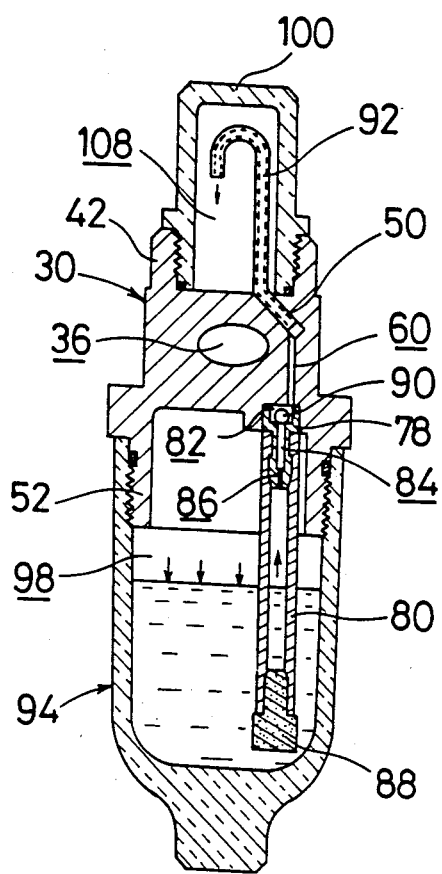
FIG. 5 is a cross-sectional view taken along line V—V of FIG. 2, showing the lubricator as assembled.

As shown in FIGS. 2 through 5, a lubricator according to the present invention has a body generally designated by the reference numeral 30. The body 30 has a fluid inlet port 32 and a fluid outlet port 34 in diametrically opposite relation, the fluid inlet and outlet ports 32, 34 being held in communication with each other through a passage 36. The passage 36 includes a first passageway 36a, a restriction passageway 37 defined by restriction members (described later), and a second passageway 36b, as shown in FIG. 4. The body 30 also has a hole 38 communicating perpendicularly to the passage 36 and also communicating at its opposite ends with a pair of holes 40a, 40b each including an enlarged portion beyond a stepped portion. A first cylinder 42 is disposed on the upper end of the body 30 and has a threaded hole 44 defined by an inner wall surface thereof. The body 30 has a small-diameter passageway 48 defined in the bottom 46 of the first cylinder 42 in communication with the second passageway 36b, and a hole 50 (FIG. 5) defined in the bottom 46 and inclined at an angle to the vertical direction. A second cylinder 52 is disposed on the lower end of the body 30 and has external threads 54 on its outer peripheral surface. A fitting portion 58 projects vertically downwardly from the bottom 56 of the second cylinder 52. A passage 60 is defined off-center in the fitting portion 58 and has one end (upper end as shown in FIG. 5) communicating with the passage 50. The bottom 56 has a hole 62 defined therein to a given depth and having one end (upper end as shown in FIG. 3) communicating with a small-diameter passageway 64 through a stepped portion, the passageway 64 communicating with the passage 36.

As shown in FIGS. 2 and 4, guide members 66a, 66b are fixedly mounted in the holes 40a, 40b, respectively, and have threads on their inner wall surfaces with which the restriction members 68a, 68b are held in threaded engagement. O-rings 70a, 70b are disposed in the hole 38 around the restriction members 68a, 68b, respectively. A pillar body 72 is fixedly disposed in the hole 62 and has a passageway 74 defined therein and communicating vertically with the passageway 64 and a passageway 76 communicating horizontally with one end of the passageway 74. An oil conduit tube coupling 78 (FIG. 5) is fixedly fitted in the fitting portion 58, and an oil conduit tube 80 is connected to the oil conduit tube coupling 78. The oil conduit tube coupling 78 has an opening 82 defined in one end thereof in communication with the passageway 60, a passageway 84 communicating with the opening 82, and a much-smaller-diameter passageway 86 communicating with the passageway 84. The oil conduit tube 80 is connected to one end (lower end) of the oil conduit tube coupling 78, with a filter 88 connected to the other end thereof. The filter 88 is formed of a sintered material for filtering oil. A check ball 90 is loosely disposed in the opening 82 of the coupling 78 for preventing oil from flowing backwards, as described later. A dropping tube 92 has one end securely fitted in the hole 50 of the body 30. The end of the dropping tube 92 fitted in the hole 50 is inclined at the angle at which the hole 50 is inclined to the vertical direction, so that an intermediate portion of the dropping tube 92 extends vertically. The other end of the dropping tube 92 is vertically spaced from and directed to the bottom 46.

A case 94 is threadedly mounted on the lower end of the body 30. More specifically, the case 94 has a threaded hole in one end, which is threaded over the external threads 54 on the second cylinder 52 of the body 30 with an O-ring 96 interposed between the case 94 and the body 30. Thus, the case 94 is hermetically fixed to the body 30. The case 94 and the body 30 define therebetween a chamber 98 supplied with oil. Where the case 94 is made of a transparent or semitransparent synthetic resin material, the amount of oil remaining in the case 94 can be visually checked.

A dropping window 100 is mounted on the top of the body 30. The dropping window 100 is preferably made of a transparent or semitransparent synthetic resin material. The dropping window 100 has external threads 102 on an outer peripheral surface of one end thereof and an annular flange 104 on an outer peripheral surface thereof. For assembly, an O-ring 106 is disposed on the bottom 46 of the first cylinder 42, and then the external threads 102 are threaded into the threaded hole 44 by turning the dropping window 100 with pliers (not shown) that holds the annular flange 104, thereby fastening the dropping window 100 to the body 30. The dropping window 100 thus mounted defines a chamber 108 therein, which communicates with the chamber 98 through the dropping tube 92, the passageway 60, the opening 82, the passageways 84, 86, and the oil conduit tube 80.

Operation and advantages of the lubricator of the above structure will be described below.

A venturi is first formed in the passage 36 dependent on the flow rate of a fluid, such as air, supplied to the fluid inlet port 32 of the body 30. More specifically, the restriction member 68a is turned about its own axis to project its distal end into the passage 36 to a desired depth, thereby defining the restriction 37 of a certain open cross-sectional area in the passage 36.

Then, air under pressure is introduced from a compressed-air supply (not shown) into the fluid inlet port 32. The air is then passed through the first passageway 36a, the restriction 37, the second passageway 36b, and the fluid outlet port 36 to an actuator (not shown), for example. At this time, a portion of the air supplied to the first passageway 36a flows through the passageway 64 into the passageway 74 in the pillar body 72. The air supplied to the passageway 74 then goes through the passageway 76 into the chamber 98. As the air under pressure is supplied into the chamber 98, the air pressure in the chamber 98 becomes higher than the atmospheric pressure, thus forcing downwardly the oil in the chamber 98 as indicated by the arrows in FIG. 3. Since the air under pressure flows through the horizontal passageway 86 into the chamber 98 at this time, the force acting on the oil surface in the chamber 98 is uniformized over the entire oil surface, preventing the oil surface from being disturbed, even when the pressure in the passageway 36a is abruptly changed. The air passing under pressure through the restriction 37 causes a pressure drop in the second passageway 36b since the latter has a larger open cross-sectional area than that of the restriction 37. Inasmuch as the chamber 108 communicates with the second passageway 36b via the passageway 48, the pressure in the chamber 108 is equalized to the pressure in the passageway 36b. Because of the pressure difference between the chamber 108 and the chamber 98, therefore, the oil in the chamber 98 is forced to flow via the coil conduit tube 80 and the passageways 86, 84 into the opening 82, from which the oil is supplied through the passageway 60 and the dropping tube 92 to drop into the dropping window 100. The oil thus supplied into the chamber 108 is drawn through the passageway 48 into the second passageway 36b in which the oil is atomized and mixed with the air flowing therethrough, so that the atomized oil is supplied to the actuator.

The restriction members 68a, 68b are displaceable axially by being turned about their own axes. Therefore, they can change the open cross-sectional area of the restriction 37 to regulate the amount of oil to be mixed with air supplied under pressure into the passage 36, even when the amount of such air supplied into the passage 36 is varied. Specifically, when the rate of air supplied under pressure into the passage 36 is high, the restriction member 68a is turned about its own axis in one direction to move axially in a direction out of the body 30 to thereby increase the open cross-sectional area of the restriction 37 defined by the distal end of the restriction member 68a in the passage 36. When the rate of air supplied under pressure into the passage 36 is high, the restriction member 68a is turned in the opposite direction to reduce the open cross-sectional area of the restriction 37. In this manner, the pressure difference between the air pressure in the passageway 36a and the air pressure in the passageway 36b is regulated to supply a suitable amount of lubricating oil into air under pressure.

Since the oil flowing through the oil conduit tube 80 first passes through the much-smaller-diameter passageway 86 and then into the dropping tube 92, no abrupt influx of oil is introduced into the dropping tube 92 even when the pressure difference between the air pressures in the chambers 98, 108. Therefore, a highly stable supply of oil to the dropping tube 92 is assured. By selecting the diameter of the dropping tube 92 to be smaller than that of the conventional dropping tube, the amount of oil in one droplet from the dropping tube 92 is relatively reduced. This is highly advantageous when supplying quite a small amount of oil to the passageway 36b. Furthermore, the lubricator of the present invention is smaller in size than the conventional lubricator since no oil needle valve is employed. The restriction members 68a, 68b are disposed on the body 30 in diametrically opposite relation and the venturi effect can be varied by displacing only one of the restriction members 68a, 68b. Consequently, the lubricator can be attached in position without limitations on the direction in which it is installed.

With the present invention, as described above, a lubricator has restriction members threaded in a body instead of an oil needle valve which would otherwise be mounted in the body making the lubricator large in size. Therefore, the overall lubricator is much smaller in size. Since the lubricator is smaller in size and the restriction members are disposed on opposite sides of the body, the lubricator can be installed without concern over an adjusting position and other positional or directional considerations even when there are various limitations such as a limited installation space available, various devices to be joined to the lubricator, and the like. Accordingly, the lubricator can easily be handled in installation and operation. The lubricator can be manufactured inexpensively since the number of required parts is reduced.

Although a certain preferred embodiment has been shown and described, it should be understood that many changes and modifications may be made therein without departing from the scope of the appended claims.

What is claimed is:

1. A lubricator comprising:
    a body having a passage for a fluid under pressure, a pair of holes communicating perpendicularly with said passage in diametrically opposite relation, and a restriction member threadedly mounted in each of said holes to define a variable restriction in said passage;
    a case securely mounted on said body and having a chamber communicating with said passage and capable of storing oil, and
    a dropping window communicating with said chamber through an oil conduit tube and a dropping tube and also communicating through a passageway with said passage downstream of said restriction members in the direction of flow of the fluid through said passage.

2. The lubricator according to claim 1, including a filter of a sintered material mounted on said oil conduit tube.

3. The lubricator according to claim 2, including guide members fitted in each of said holes and having threads with which said restriction members are held in threaded engagement.

* * * * *